US011115407B2

(12) United States Patent
Lakshminarayana et al.

(10) Patent No.: US 11,115,407 B2
(45) Date of Patent: Sep. 7, 2021

(54) CLIENT SIDE OTP GENERATION METHOD

(71) Applicant: Bank of America Corporation, Charlotte, NC (US)

(72) Inventors: Nagasubramanya Lakshminarayana, Hyderabad (IN); Vijay Kumar Yarabolu, Hyderabad (IN)

(73) Assignee: Bank of America Corporation, Charlotte, NC (US)

(*) Notice: Subject to any disclaimer, the term of this patent is extended or adjusted under 35 U.S.C. 154(b) by 132 days.

(21) Appl. No.: 16/738,466

(22) Filed: Jan. 9, 2020

(65) Prior Publication Data

US 2021/0218732 A1 Jul. 15, 2021

(51) Int. Cl.
| | | |
|---|---|---|
| *H04L 29/06* | (2006.01) | |
| *H04L 29/08* | (2006.01) | |
| *H04L 9/08* | (2006.01) | |
| *H04L 9/06* | (2006.01) | |

(52) U.S. Cl.
CPC ........ *H04L 63/0838* (2013.01); *H04L 9/0643* (2013.01); *H04L 9/0869* (2013.01); *H04L 63/0876* (2013.01); *H04L 67/1097* (2013.01); *H04L 67/42* (2013.01)

(58) Field of Classification Search
CPC . H04L 63/0838; H04L 9/0643; H04L 9/0869; H04L 63/0876; H04L 67/1097; H04L 67/42
See application file for complete search history.

(56) References Cited

U.S. PATENT DOCUMENTS

| | | |
|---|---|---|
| 7,904,946 B1 | 3/2011 | Chu et al. |
| 8,132,243 B2 | 3/2012 | Bychkov |
| 8,381,271 B2 | 2/2013 | Dingwall et al. |
| 8,763,097 B2 | 6/2014 | Bhatnagar et al. |
| 9,503,453 B2 | 11/2016 | Song et al. |

(Continued)

FOREIGN PATENT DOCUMENTS

KR 20160031083 A * 3/2016

OTHER PUBLICATIONS

IBM "One-time password delivery methods and providers", Aug. 13, 2019, pp. 1-3.

(Continued)

*Primary Examiner* — Arvin Eskandarnia
(74) *Attorney, Agent, or Firm* — Banner & Witcoff, Ltd.; Michael A. Springs

(57) ABSTRACT

A client-server security architecture is disclosed that uses a masked grid, a seed, and mutual unlocking techniques to authentication a client device with a server machine using a one-time code (OTC). The client device in the client-server architecture stores a masked grid that is used to unlock an authentication code using a seed. Once mutually unlocked, the client device may generate an OTC to attempt to authenticate the client device with a server machine. The server machine validates that OTC with the OTC stored at the server to confirm they match. Each subsequent access may repeat the aforementioned steps. Moreover, in a multi-device ecosystem, a plurality of client devices may leverage a primary client device to connect with the server machine. For example, one or more subordinate client devices may connect to the primary client device to then tunnel through to the server machine in a secure manner.

20 Claims, 7 Drawing Sheets

(56) References Cited

U.S. PATENT DOCUMENTS

| | | |
|---|---|---|
| 9,800,574 B2 | 10/2017 | Teixeron et al. |
| 9,998,456 B2 | 6/2018 | Noh et al. |
| 10,009,340 B2 | 6/2018 | Berg |
| 2017/0337537 A1* | 11/2017 | Weiss .................... G06Q 20/34 |
| 2018/0139051 A1* | 5/2018 | Ghosh .................. H04L 9/0637 |

OTHER PUBLICATIONS

IBM "One-time passwords", Aug. 13, 2019, pp. 1-3.
Wikipedia "Multi-factor authentication", Aug. 13, 2019, pp. 1-6.
Wikipedia "One-time password", Aug. 13, 2019, pp. 1-4.

\* cited by examiner

CLIENT SIDE OTP GENERATION METHOD

TECHNICAL FIELD

Aspects of the disclosure provide effective, efficient, and scalable technical solutions that address and overcome the technical problems associated with systems and methods that generate one-time passwords (OTPs) at a client-side machine, including multi-device client environments, by using one or more features disclosed herein. One embodiment discloses a multi-device validation method and system that comprises authentication using a seed and mutual unlocking techniques.

BACKGROUND

An OTP is a password that is valid for only one login session or transaction, on a computer system or other digital device, Wikipedia explains. OTPs avoid a number of shortcomings that are associated with traditional authentication. Some OTP implementations also incorporate two-factor authentication by ensuring that the OTP requires access to something a person has in their possession, such as a specific smartphone in combination with a user's PIN. OTPs are notably different from traditional authentication systems in that OTP systems are less vulnerable to replay attacks. Another benefit of OTP systems is that it permits a user to re-use the same PIN for multiple systems without leaving the user vulnerable across all systems if the password is maliciously revealed. Moreover, Wikipedia explains that OTPs have been discussed as a possible replacement for, as well as enhancer to, traditional passwords.

Nevertheless, there is for room for improvements to OTP systems. The combination of features disclosed herein address one or more of risks and/or drawbacks in existing computing solutions to provide a technical solution to a technological problem in the industry.

SUMMARY

The following presents a simplified summary in order to provide a basic understanding of some aspects of the disclosure. The summary is not an extensive overview of the disclosure. It is neither intended to identify key or critical elements of the disclosure nor to delineate the scope of the disclosure. The following summary merely presents some concepts of the disclosure in a simplified form as a prelude to the description below.

In one example, apparatuses, method steps, and systems are described here for a client-server security architecture that uses a masked grid, a seed, and mutual unlocking techniques to authentication a client device with a server machine using a one-time code (OTC). The client device in the client-server architecture stores a masked grid that is used to unlock an authentication code using a seed. Once mutually unlocked, the client device may generate an OTC to attempt to authenticate the client device with a server machine. The server machine validates that OTC with the OTC stored at the server to confirm they match. Each subsequent access may repeat the aforementioned steps. For example, a system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions.

One general aspect includes a method for enrolling a client machine with a server machine for later authentication with a one-time code (OTC), the method including steps performed by the server machine including: receiving an enrollment request from the client machine; generate a plurality of data values stored in a data grid in memory on the server machine; generate a seed stored in a data array in memory on the server machine; transform the data grid into a masked data grid using the seed; hash the seed; and transmit a cypher text to the client machine, where the cypher text includes the masked data grid and the hashed seed, where the client machine solves the cypher text to authenticate itself with the server machine. Other embodiments of this aspect include corresponding computer systems, apparatus, and computer programs recorded on one or more computer storage devices, each configured to perform the actions of the methods.

Implementations may include one or more of the following features. The method further including steps performed by the server machine including: receive the OTC from the client machine; validate the OTC using the data grid, authorization codes, and seed; and after validation of the OTC, grant access to the client machine to a database communicatively coupled to the server machine, where prior to the validating the client machine was prohibited from accessing the database. The method where the validating the OTC further includes steps performed by the server machine including: un-hashing the OTC received from the client machine; confirming that the unhashed OTC matches the authorization codes stored in the memory at the server machine; and establishing a secure connection for the client machine to access the database at the server machine. The method further including steps performed by the server machine including: receive a constructed solution generated by the client machine using the seed and data values in the masked grid; unmask the seed using the constructed solution from the client machine and the data grid stored in the memory at the server machine; transmit an unmasked seed to the client machine; and transmit the authorization codes to the client machine. The method where the authorization codes from the server machine are received, by the client machine, before constructing the solution for the cypher text; and where the constructing, by the client machine, the solution for the cypher text uses the authorization codes. The method where the masked grid is a 2d matrix with data values. The method where the seed includes at least s0, s1, and s2, and where the authorization codes include x-coordinates and y-coordinates corresponding to the 2d matrix. The method where the data grid stored in the memory at the server machine includes a 2d matrix with the plurality of data values corresponding to x-coordinates and y-coordinates on the 2d matrix, and where the authorization codes are x-y coordinate pairings corresponding to the 2d matrix. Implementations of the described techniques may include hardware, a method or process, or computer software on a computer-accessible medium.

One general aspect includes a system for enrolling a client machine with a server machine for later authentication with an OTC, the system including: a server machine including a processor and a memory storing an authentication module. The system also includes a client machine including a processor, a memory, and a network communication interface, where the first client machine is communicatively coupled to the server machine via the network communication interface, where the memory of the first client machine further stores an interface to the authentication module; where the authentication module, when executed by the processor of the server machine, causes the server machine to perform various method steps disclosed herein. Another general aspect includes an apparatus for enrolling a client machine for later authentication with an OTC, the apparatus including: a network communication interface communicatively coupling the apparatus with the client machine. The apparatus also includes a processor; and a memory storing computer-executable instructions that, when executed by the processor, cause the apparatus to perform one or more of the method steps disclosed herein. Other embodiments of this aspect include corresponding computer systems, apparatus, and computer programs recorded on one or more computer storage devices, each configured to perform the actions of the methods.

In another example, this application discloses a multi-device environment that may include authentication methods and systems that use a seed and mutual unlocking techniques to validate a secure connection. In the multi-device ecosystem, a plurality of client devices may leverage a primary client device to connect with the server machine. For example, one or more subordinate client devices may connect to the primary client device to then tunnel through to the server machine in a secure manner. A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions.

One general aspect includes a system for authenticating a plurality of client machines with a server machine using one-time codes, the system including: a server machine including a processor and a memory storing an authentication module. The system also includes a first client machine including a processor, a memory, and a network communication interface, where the first client machine is communicatively coupled to the server machine via the network communication interface, where the memory of the first client machine further stores an interface to the authentication module. The system also includes a second and/or third client machines coupled to the first client machine and which is not in direct communication with the server machine. In some embodiments, the second machine is configured to authenticate and validate a secure connection with the server machine through the first client machine by using a cypher text that the authentication module of the server machine used to validate the first client machine, and where the second client machine stores computer-executable instructions that, when executed by a processor, cause the system to perform various method steps disclosed herein. The system also includes instruction that store, by the second client machine, a second cypher text in memory at the second client machine, where the second cypher text includes a second masked grid with a second seed. The system also includes instructions that construct, by the second client machine, a second solution for the second cypher text using the second seed and data values in the second masked grid. The system also includes transmits, by the second client machine, the constructed second solution to the first client machine to unlock the second masked grid. The system also includes unmasking the second seed, by the first client machine, using the constructed second solution from the second client machine and a second data grid stored in memory at the first client machine. The system also includes transmitting, by the first client machine, an unmasked second seed and second authorization codes to the second client machine. The system also includes dynamically generating, by the second client machine, a second one-time code using the second unmasked seed, the second authorization codes, and the second masked grid. The system also includes sending, by the second client machine, the second OTC to the first client machine, where the second OTC corresponds to the second authorization codes. The system also includes validating, by the first client machine, the second OTC from the second client machine using the second data grid stored in memory at the first client machine. The system also includes after validation of the second OTC by the first client machine, granting, by the first client machine, the second client machine access to the server machine. Other embodiments of this aspect include corresponding computer systems, apparatus, and computer programs recorded on one or more computer storage devices, each configured to perform the actions of the methods.

Implementations may include one or more of the following features. The system where the authentication module is configured to perform a method including steps to: store, through the interface at the first client machine, the cypher text in memory at the first client machine, where the cypher text includes a masked grid with a seed; construct, by the interface at the first client machine, a solution for the cypher text using the seed and data values in the masked grid; transmit, by the interface at the first client machine, the constructed solution to the server machine to unlock the masked grid; unmask the seed, by the server machine, using the constructed solution from the first client machine and a data grid stored in memory at the server machine; transmit, by the server machine, an unmasked seed to the first client machine; transmit, by the server machine, authorization codes to the first client machine; dynamically generate, by the interface at the first client machine, a OTC using the unmasked seed, the authorization codes, and the masked grid; send, by the interface at the first client machine, the OTC to the server machine, where the OTC corresponds to the authorization codes; validate, by the server machine, the OTC from the first client machine using the data grid stored in memory at the server machine; and after validation of the OTC by the server machine, grant, by the server machine, the first client machine access to a database at the server machine. The system where the authentication module of the server machine, when executed by the processor of the server machine, causes the server machine to: retrieve a seed; transmit the seed to the first client machine; receive an OTC from the first client machine, where the OTC was dynamically generated at the first client machine; validate the OTC; and upon validation of the OTC, send an indication of grant to the first client machine to access a database at the server machine. Implementations of the described techniques may include hardware, a method or process, or computer software on a computer-accessible medium.

One general aspect includes a method for authenticating a client machine with a server machine using an OTC, the method including steps to: store, by the client machine, a cypher text in memory at the client machine, where the cypher text includes a masked grid with a seed; construct, by the client machine, a solution for the cypher text using the seed and data values in the masked grid; transmit, by the client machine, the constructed solution to the server machine to unlock the masked grid; unmask the seed, by the server machine, using the constructed solution from the client machine and a data grid stored in memory at the server machine; transmit, by the server machine, an unmasked seed to the client machine; transmit, by the server machine, authorization codes to the client machine; dynamically generate, by the client machine, a one-time code (otc) using the unmasked seed, the authorization codes, and the masked grid; send, by the client machine, the otc to the server machine, where the otc corresponds to the authorization codes; validate, by the server machine, the otc from the client machine using the data grid stored in memory at the server machine; and after validation of the otc by the server machine, grant, by the server machine, the client machine access to a database at the server machine. Other embodiments of this aspect include corresponding computer systems, apparatus, and computer programs recorded on one or more computer storage devices, each configured to perform the actions of the methods.

Implementations may include one or more of the following features. The method further including steps to recycle the cypher text to authenticate a second client machine, which is not in direct communication with the server machine, to: store, by the second client machine, a second cypher text in memory at the second client machine, where the cypher text includes a second masked grid with a second seed; construct, by the second client machine, a second solution for the second cypher text using the second seed and data values in the second masked grid; transmit, by the second client machine, the constructed second solution to the client machine to unlock the second masked grid; unmask the second seed, by the client machine, using the constructed second solution from the second client machine and a second data grid stored in memory at the client machine; transmit, by the client machine, an unmasked second seed to the second client machine; transmit, by the client machine, second authorization codes to the second client machine; dynamically generate, by the second client machine, a second one-time code using the second unmasked seed, the second authorization codes, and the second masked grid; send, by the second client machine, the second otc to the client machine, where the second otc corresponds to the second authorization codes; validate, by the client machine, the second otc from the second client machine using the second data grid stored in memory at the client machine; and after validation of the second otc by the client machine, grant, by the client machine, the second client machine access to the server machine. Implementations of the described techniques may include hardware, a method or process, or computer software on a computer-accessible medium. Another general aspect includes one or more non-transitory computer-readable media storing instructions that, when executed by one or more computer processors, causes one or more client machines to perform the method steps disclosed herein. Other embodiments of this aspect include corresponding computer systems, apparatus, and computer programs recorded on one or more computer storage devices, each configured to perform the actions of the methods.

These features, along with many others, are discussed in greater detail below.

BRIEF DESCRIPTION OF THE DRAWINGS

The present disclosure is illustrated by way of example and not limited in the accompanying figures in which like reference numerals indicate similar elements and in which.

In the following description of various illustrative embodiments, reference is made to the accompanying drawings, which form a part hereof, and in which is shown, by way of illustration, various embodiments in which aspects of the disclosure may be practiced. It is to be understood that other embodiments may be utilized and structural and functional modifications may be made, without departing from the scope of the present disclosure. It is noted that various connections between elements are discussed in the following description. It is noted that these connections are general and, unless specified otherwise, may be direct or indirect, wired or wireless, and that the specification is not intended to be limiting in this respect.

DETAILED DESCRIPTION

In one example, apparatuses, method steps, and systems are described here for a client-server security architecture that uses a masked grid, a seed, and mutual unlocking techniques to authentication a client device with a server machine using a one-time code (OTC). The client device in the client-server architecture stores a masked grid that is used to unlock an authentication code using a seed. Once mutually unlocked, the client device may generate an OTC to attempt to authenticate the client device with a server machine. The server machine validates that OTC with the OTC stored at the server to confirm they match. Each subsequent access may repeat the aforementioned steps.

In one example, a multi-device environment may include authentication methods and systems that use a seed and mutual unlocking techniques to validate a secure connection. In the multi-device ecosystem, a plurality of client devices may leverage a primary client device to connect with the server machine. For example, one or more slave/subordinate client devices may connect to the master/primary client device to then tunnel through to the server machine in a secure manner.

Figure 1:
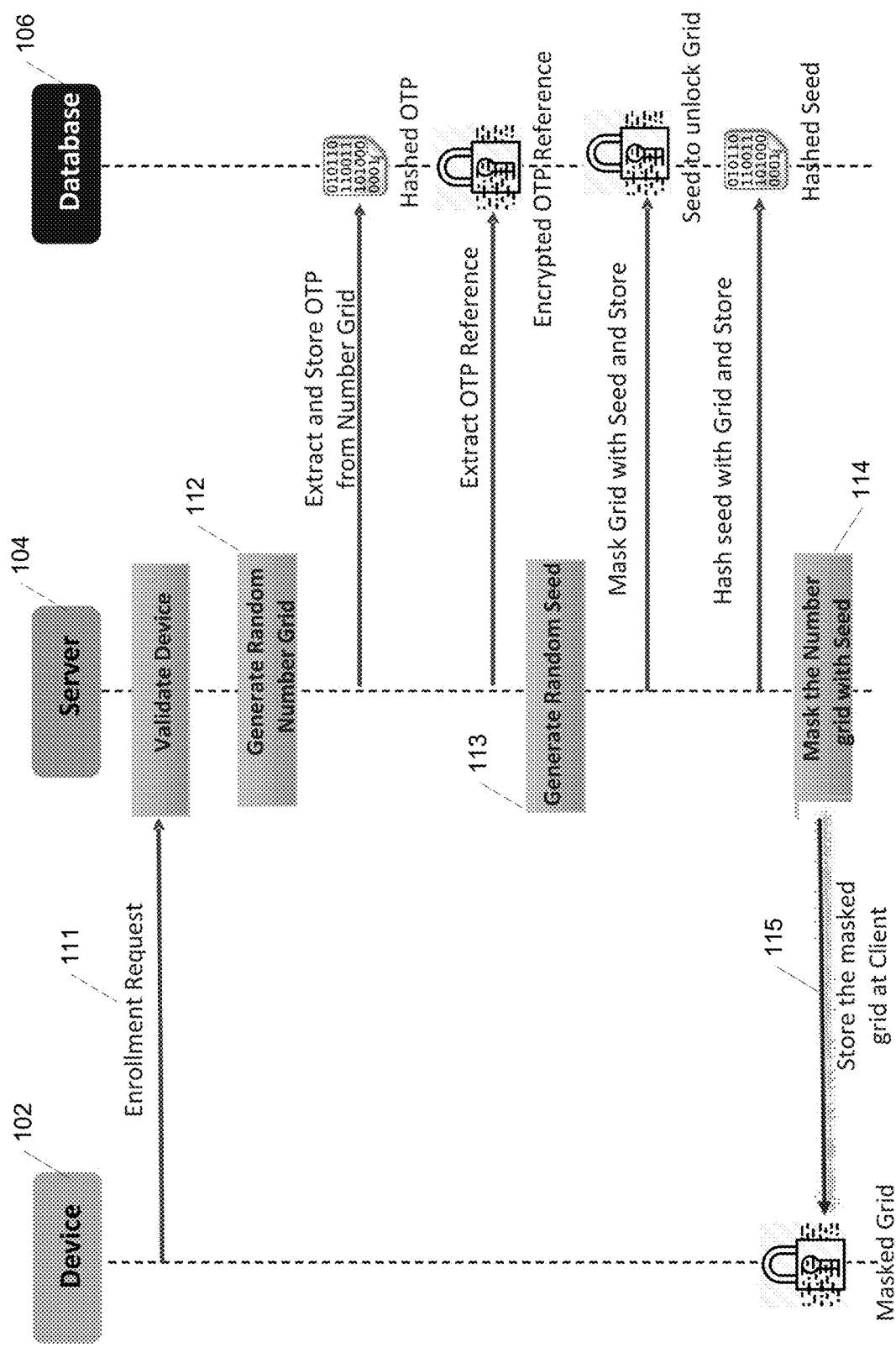
FIG. 1 illustrates a client-server architecture that enrolls a client device with a server machine that generates a masked grid using a seed, in accordance with one or more example embodiments.

Referring to FIG. 1, the flow diagram 100 illustrates a client-server architecture that enrolls a client device 102 with a server machine 104 that generates a masked grid 304 using a seed 306, in accordance with one or more example embodiments disclosed herein. A method is illustrated for enrolling the client machine with the server machine for later authentication with a one-time code (OTC). In one example, the server machine 104 performs one or more steps comprising receiving 111 an enrollment request from the client machine 102. The client machine 102 may generate and transmit an OTC from the client machine to the server machine 104. The server machine 104 may performs additional steps, as illustrated in FIG. 1, comprising generating 112 a plurality of data values stored in a data grid in memory 505B on the server machine 104. The server machine may generate a fresh data grid for each enrollment request received from client devices. Thus, security is maximized.

Figure 3:
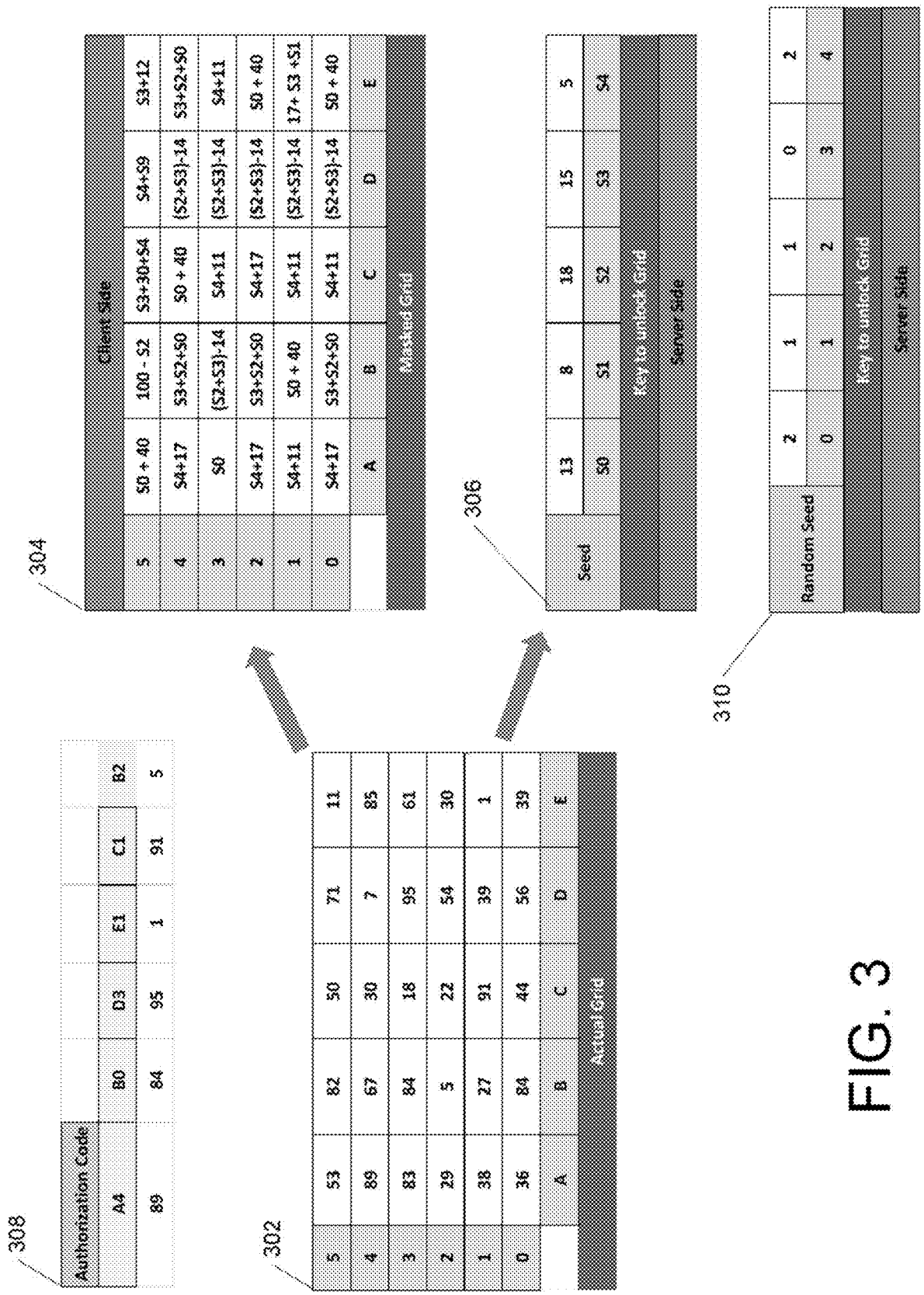
FIG. 3 includes tables with illustrative masked values corresponding to various variables described herein in accordance with one or more example embodiments.

Referring to FIG. 1, in addition to the data grid, the server machine 104 may also generate 113 a seed 306 stored in a data array in the memory 505B on the server machine 104. An example of the random seed data array 310 is illustrated in FIG. 3, which is described below.

With the data grid and seed ready, the server machine 104 then, in some examples, transforms 114 the data grid into a masked data grid using the seed, and then hashes the seed for added security. The masked grid and the hashed seed may form a cypher text that the server machine 104 can safely transmit 115 to the client machine 102. In some examples, the masked grid may comprise a two-dimensional (2D) matrix with data values.

The client machine 102 may then attempt to solve the cypher text to authenticate itself with the server machine 104. In some examples, the client machine 102 receives authorization codes 308 from the server machine 104 before constructing the solution for the cypher text. The client machine 102 may used the authorization codes to construct the solution for the cypher text. In yet other examples, the authorization codes may comprise x-coordinates and y-coordinates of a 2D matrix corresponding to the masked grid. And, the seed 306 may comprise at least values S0, S1, and S2, as illustrated in FIG. 3. For example, the data grid 304 stored in the memory at the server machine 104 may comprises a plurality of data values corresponding to x-coordinates and y-coordinates, and the authorization codes are x-y coordinate pairings corresponding to the values stored in the data grid 304. In other words, an authorization code of B0 corresponds to the value "84" in table 302, which corresponds to a masked value comprising seed (e.g., S0, S1, S2, and so on) values and/or static values combined in an arithmetic operation.

Like the client machine 102, the server machine 104 may be programmed to validate the OTC using the data grid 302, authorization codes 308, and seed 306 stored on the server machine 104. For example, the server machine 104 may receive a constructed solution generated by the client machine 102 using the seed and data values in the masked grid. Then, the server machine 104 may unmask the seed using the constructed solution from the client machine 102 and the data grid stored in the memory at the server machine. Finally, the server machine 104 may transmit an unmasked seed and the authorization codes 208 to the client machine 102. Upon receipt, the client machine 102 may process and compare the received values with the values it stores in its memory. When the values match, the authentication process is successful. After validation of the OTC, the client machine 102 may be granted access to a database 106 communicatively coupled to the server machine 104. Prior to validation, the client machine 102 may have been prohibited from accessing the database 106. In some examples, the server machine 104 may, after validating the OTC, then un-hash the OTC received from the client machine 102, confirm that the unhashed OTC matches the authorization codes stored in the memory at the server machine; and then establish a secure connection for the client machine 102 to access a secure database 106.

Figure 2:
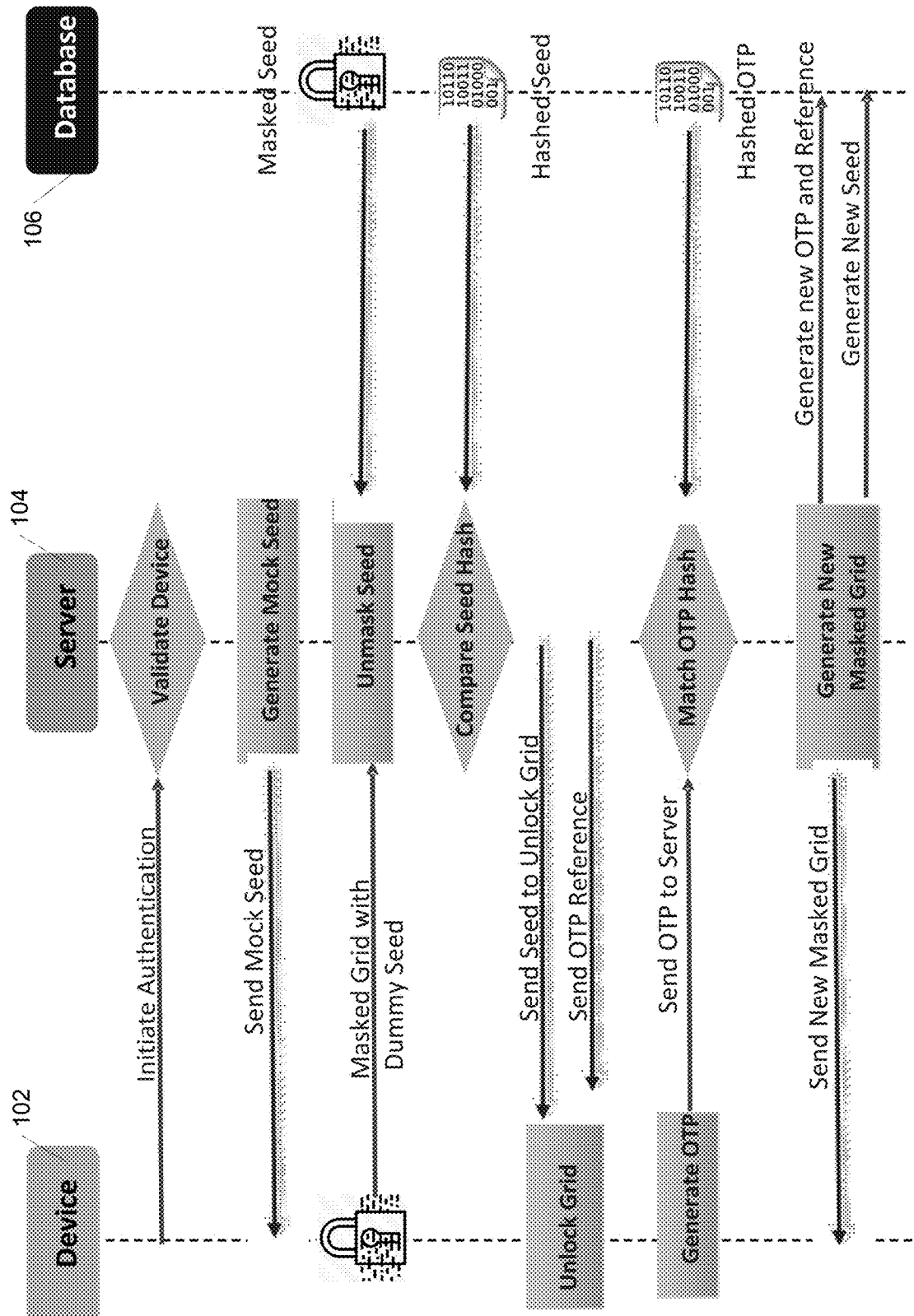
FIG. 2 illustrates a client-server architecture that validates a client device with a server machine using a masked grid with a seed, in accordance with one or more example embodiments.

FIG. 2 illustrates a client-server architecture that validates a client device 102 with a server machine 104 using a masked grid with a seed, as illustrated in FIG. 3. Referring to FIG. 3, the data tables and values illustrated therein are used in a client-server environment to, among other things, authenticate a client machine with a server machine using a one-time code (OTC), as illustrated in FIG. 2.

The steps performed may include, but are not limited to: storing, by the client machine 102, a cypher text in memory at the client machine. The cypher text may, in some examples, include a masked grid with a seed. FIG. 3 illustrates a grid of data that may be used with masking and a key to authenticate a client device 102 with a server machine 104 in accordance with one or more example embodiments disclosed herein. The client machine 102 may construct, in some examples, a solution for the cypher text using the seed and data values in the masked grid. The client machine 102 may then transmit the constructed solution 304 to the server machine 104 to unlock the masked grid. In some examples, the masked grid 304 may be a 2D matrix with data values, and where the seed includes at least S0, S1, and S2. Table 304 shows cells with values calculated with variables S0 to S8, that together total a value, such as a numeric value.

At the server machine 104, upon receipt of the constructed solution 304, the server machine may unlock the masked grid by, inter alia, identifying portions of the constructed solution that reference S0 and calculating a value of S0 using the identified portions and corresponding data values stored in the data grid. The server machine may confirm that the calculated value of S0 matches the value of S0 previously stored (e.g., table 310) in memory at the server machine. If the values match, then the step has passed authentication and the server machine 104 may transmit the unmasked seed to the client machine 102. In some example, the unmasked seed may include the stored value of S0.

In response, the server machine 104 may unmask the seed using both the constructed solution from the client machine 102 and a data grid 302 stored in memory at the server machine. Then, the server machine 104 may transmit an unmasked seed 306 to the client machine 102. The server machine 104 may also transmit authorization codes 308 to the client machine 102. In some examples, the authorization codes may include x-coordinates and y-coordinates corresponding to a two-dimensional (2D) matrix. The 2D matrix may correspond to a masked grid 304 with data values. In some examples, the data grid stored in the memory at the server machine may include a 2D matrix with data values corresponding to x-coordinates and y-coordinates on the 2D matrix, and where the authorization codes are x-y coordinate pairings corresponding to the 2D matrix. For example, the authorization codes (references) may be A4, B0, and others. Meanwhile, the data grid 302 stored at the server machine 104 may include a value of "89" at the coordinates of column A, row 4; and a value of "84" at column B, row 0. Therefore, the values corresponding to the authorization codes may only be determined once the client-server have been authenticated.

In one example, in response to the aforementioned steps, the client machine 102 may dynamically generate a one-time code (OTC) using one or more of the unmasked seed, the authorization codes, and/or the masked grid. Then, the client machine 102 may send the OTC to the server machine 104, where the OTC corresponds to the authorization codes. In some examples, the client machine 102 may hash the OTC before sending to the server machine 104. The client machines 102 may postpone constructing the solution for the cypher text until after the authorization codes are received from the server machine 104. Because, in some examples, the client machine 102 uses the authorization codes for constructing the solution for the cypher text. In other example, in addition to hashing the OTC before sending to the server machine 104, the client machine 102 may decrypt the authorization codes received from the server machine.

In response to one or more of the aforementioned steps, the server machine 104 validates the OTC received from the client machine 102 using the data grid 302 stored in memory at the server machine. After validation of the OTC, the server machine may grant the client machine 102 access to a database 106 communicatively coupled to and/or implemented inside the server machine 104. The database 106 may store data that only authorized client machines may be provided with access. In some example, the validating the OTC steps may include steps, by the server machine 104, to un-hash the OTC received from the client machine 102, and confirm that the unhashed OTC matches the authorization codes stored in the memory at the server machine. If it does match, the server machine 104 may authorize the client machine to establish a secure connection to access the aforementioned database 106 at the server machine. Although the tables in FIG. 3 are shown with the client machine 102 having stored in its memory a masked version 304 of the data grid, in some examples, the data grid may be stored unmasked.

Figure 4:
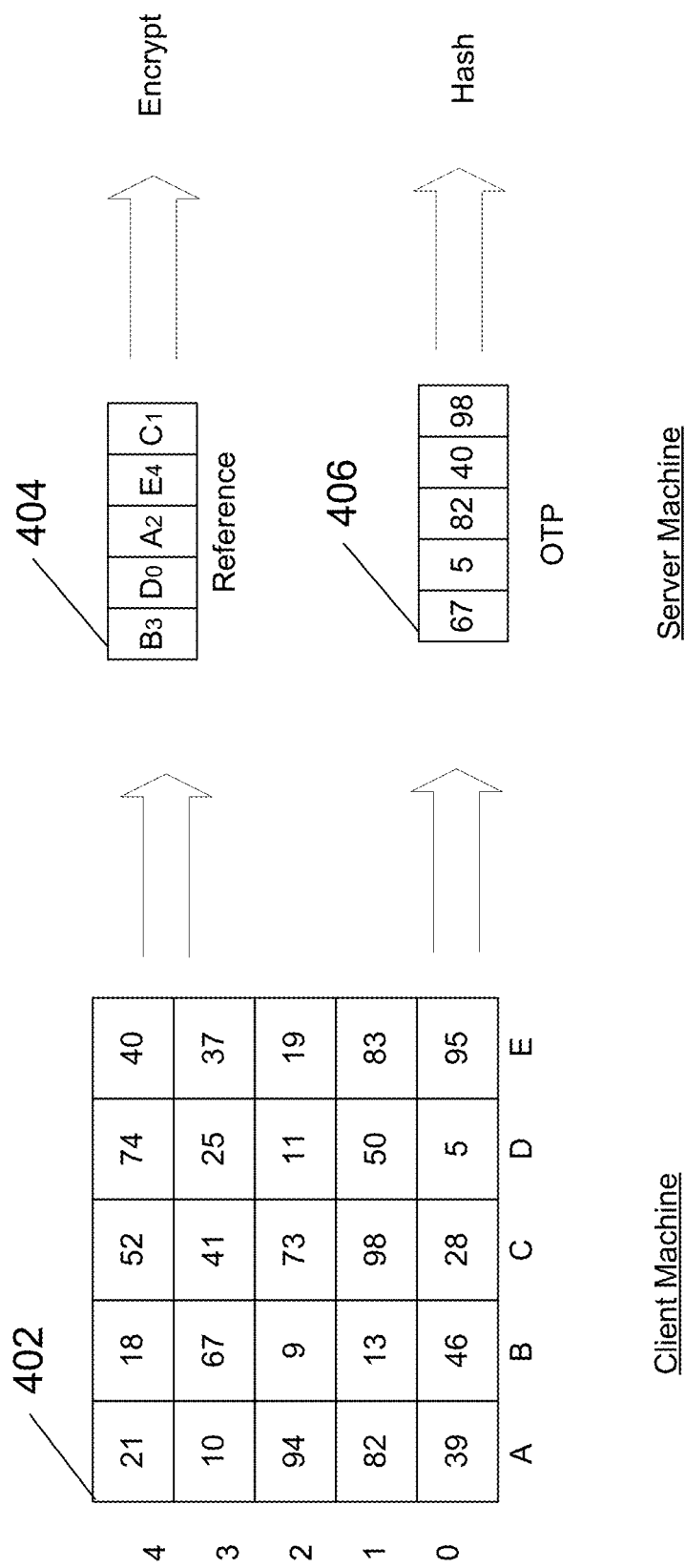
FIG. 4 includes tables with illustrative unmasked values corresponding to various variables described herein in accordance with one or more example embodiments.

FIG. 4 illustrates a grid of data that may be used with a client machine to generate a one-time code (OTC), in accordance with one or more example embodiments disclosed herein. The one-time code (OTC) may be dynamically generated using an unmasked seed, authorization codes, and/or a masked grid. In some examples, all three items may be used to generate the OTC, but in other examples, all three items may not be necessary. For example, data grid 402 is stored on the client machine 102 in an unmasked format. Meanwhile, the reference may include authorization codes that are encrypted when transmitted by the client machine 102 to the server machine 104. Meanwhile, the OTC may also, in some examples, be hashed. As a result, the table 308 in FIG. 3 may be similar to the reference array table 404 and OTC 406 in FIG. 4. At least one benefit of storing in an unmasked format is that less computing power is necessary to unlock than a masked data grid.

Figure 5:
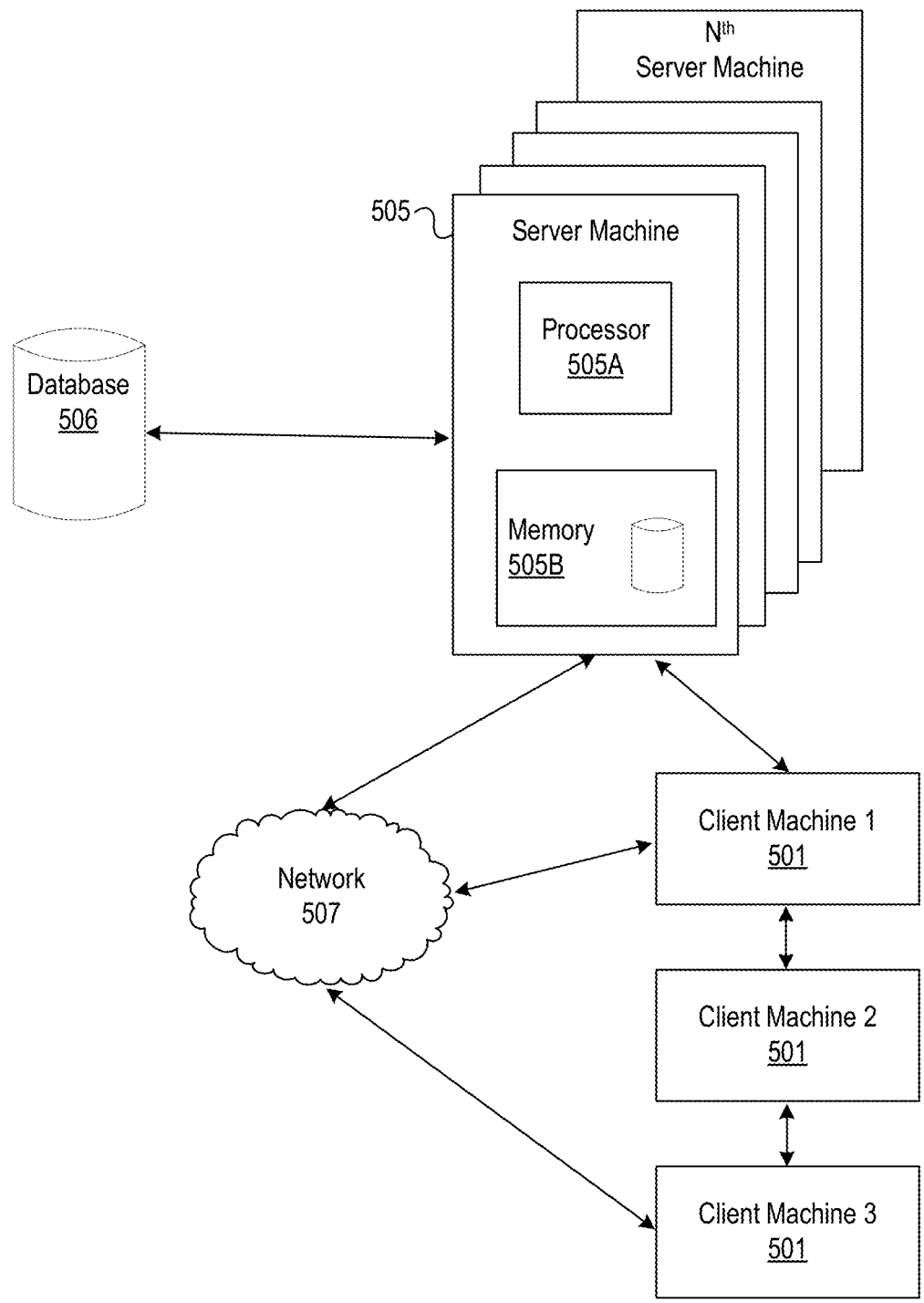
FIG. 5 depicts illustrative computing environments in accordance with one or more example embodiments.

Regarding FIG. 5, one aspect of the disclosure illustrates a system for authenticating a plurality of client machines 501 with a server machine 505 using one-time codes, and the system includes at least a server machine, a first client machine, a second client machine, and a third client machine. The server machine 505 includes a processor 505A and a memory 505B storing an authentication module (not illustrated in FIG. 5). The first client machine 501 includes a processor, a memory, and a network communication interface. The memory of the first client machine may store an interface to the authentication module such that the through the interface, the client machine operates in coordination with the authentication module in the server machine—for example, as in a client component and server component in a client-server architecture. Of course, in other embodiments, the interface at the first client machine might not be a thin interface, but rather a duplicate of the authentication module at the server machine.

Referring to FIG. 5, the first client machine is communicatively coupled to the server machine via the network communication interface and a network 507. As described with respect to FIG. 3, the server machine 505 and first client machine 501 may already have been authenticated with a client-server security architecture that uses a masked grid, a seed, and/or mutual unlocking techniques. For example, the first client machine may store a cypher text in memory that includes a masked grid with a seed, and then construct and transmit a solution for the cypher text to a server machine 505 to unlock the masked grid. The first client machine 501 may perform additional steps to authenticate and validate a secure connection with the server machine 505, as explained with respect to FIG. 3. For example, the authentication module, when executed by the processor 505A of the server machine 505, may causes the server machine to retrieve and transmit a seed to the first client machine 501, and in response receive a dynamically-generated OTC from the first client machine; then, the processor 505A may successfully validate the OTC and send an indication of grant to the first client machine to access a database and/or other resources at the server machine 505.

Therefore, with the first client machine 501 already authenticated with the server machine 505, the disclosure contemplates that the circle of trust may be extended to authenticate additional client machines by recycling aspects of the masked grid, seed, and mutual unlocking techniques used between the server machine and the first client machine. For example, a second client machine may be coupled to the first client machine, as illustrated in FIG. 5. In contrast to the first client machine, the second client machine might not be in direct communication with the server machine. Rather, as explained herein, the second client machine 501 is configured to authenticate and validate a secure connection with the server machine 505 through the first client machine by using a cypher text that the authentication module of the server machine used to validate the first client machine 501.

Furthermore, an optional third client machine may be coupled to the second client machine. The third client machine may or may not be directly connectable to the server machine 505 via a network 507. In some examples, the third client machine 501 may communicate through the second client machine to the first client machine to the server machine 505. In other examples, the third client machine may communicate directly through the network 507 to the server machine 505. Additional client machines may be connected to, either directly or indirectly, with the client machines 501 in accordance with various aspect of the disclosure. Other embodiments may include corresponding computer systems, apparatus, and computer programs recorded on one or more computer storage devices, each configured to perform the actions of the methods described herein.

Regarding the second client machine 501 in FIG. 5, the second client machine may store computer-executable instructions that, when executed by a processor, cause the system 500 to perform one or more steps of a method for authenticating the plurality of client machines with a server machine using one-time codes (OTCs). Implementations of the described techniques may include hardware, a method or process, or computer software on a computer-accessible medium. For example, the second client machine 501 may store a second cypher text in memory at the second client machine. The second cypher text may include a second masked grid with a second seed. The second client machine 501 may construct a solution for the second cypher text using the second seed and data values in the second masked grid, and then transmit the constructed second solution to the first client machine to unlock the second masked grid.

In response, the first client machine 501 may unmask the second seed using the constructed second solution from the second client machine and a second data grid stored in memory at the first client machine. And then transmit, by the first client machine, the unmasked second seed to the second client machine. The first client machine may also transmit a second authorization codes to the second client machine. With the two machines working to authenticate their communications channel, the second client machine may dynamically generate a second one-time code using the second unmasked seed, the second authorization codes, and the second masked grid. And then send the second OTC, which corresponds to the second authorization codes, to the first client machine.

Finally, the first client machine validates the second OTC from the second client machine using the second data grid stored in memory at the first client machine. After validation of the second OTC by the first client machine, the first client machine 501 grants the second client machine access to the server machine 505 and its coupled resources.

Figure 6:
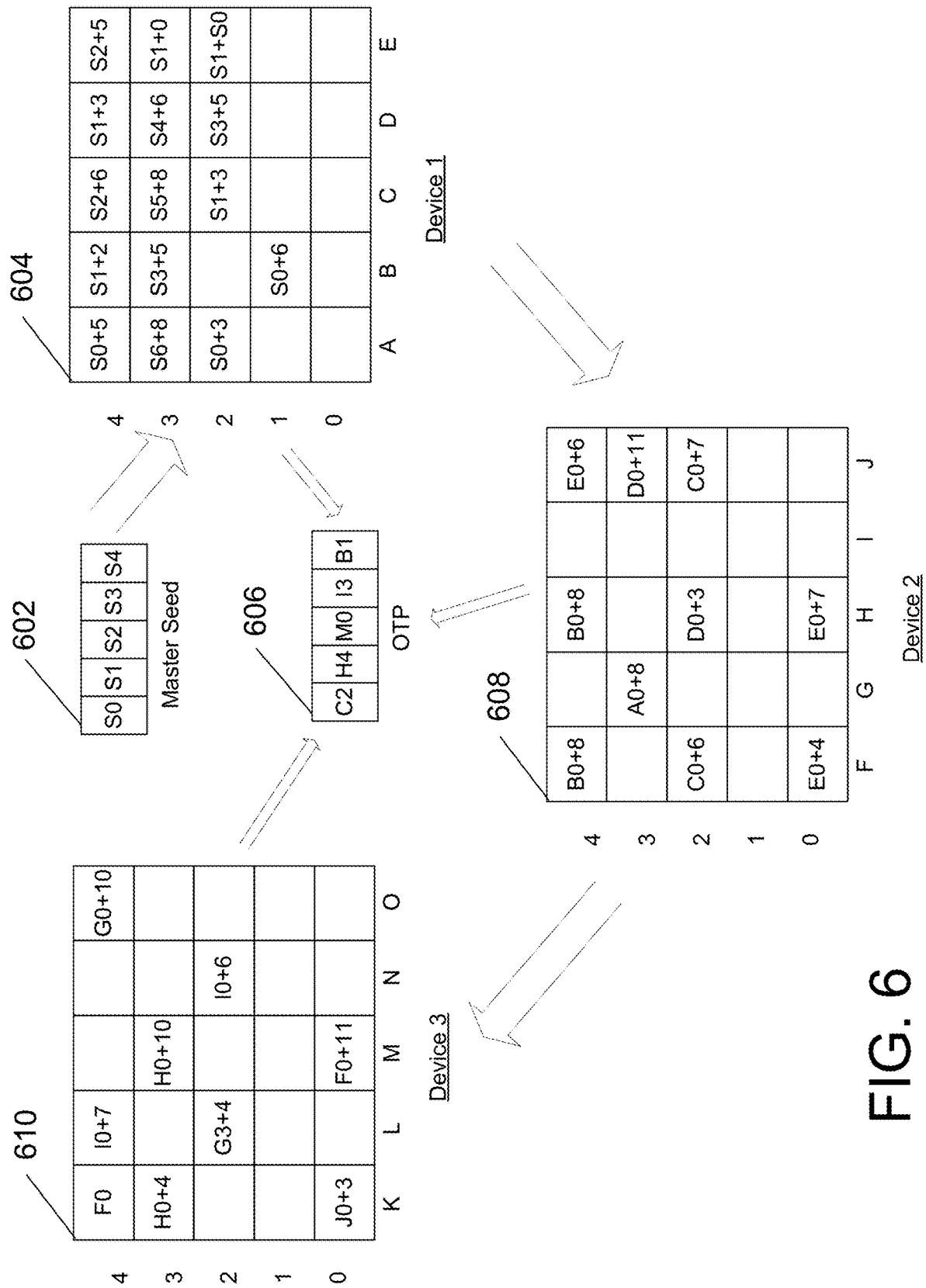
FIG. 6 depicts a computing environment with multiple client devices communicating in an authenticated manner using masked grids with seeds, in accordance with one or more example embodiments.

FIG. 6 depicts illustrative interactions between multiple client machines 604, 608, 6010 validating with a master client device 604 and a server machine (not shown) using a masked grid with a seed, in accordance with one or more example embodiments. The configuration, implementation, and interactions of the master client device 604 with the server machine are similar to the steps and components described with respect to FIG. 3 and FIG. 5; for example, the master client device 604 may already have been authenticated with a server machine. The master client device 604 may store a cypher text in memory that includes a masked grid with a seed, and then construct and transmit a solution for the cypher text to a server machine to unlock the masked grid. The master client device 604 may perform additional steps to authenticate and validate a secure connection with the server machine, as explained with respect to FIG. 3.

Furthermore, the master client device 604 in FIG. 6 further interacts with one or more additional client machines 608, 610. The plurality of client machines 608, 610 may be embodied with a processor, memory, and communications interface similar to client machine 604. Alternatively, the plurality of client machines 608, 610 may be a smartwatch, an augmented reality (AR) headgear, and/or other user electronic devices.

To further efficiencies and improve security, the master client device 604 may recycle aspects of the cypher text to authenticate a second client machine, which might not have direct communication with the server machine. Referring to the masked grid stored at the (master) first client device 604 in FIG. 6, the first client device further mask the masked grid using a second seed. As explained with respect to FIG. 3, the master seed 602 may be provided by a server machine to a first client machine to authenticate the server-client communication. Meanwhile, with respect to FIG. 6, the first client machine 604 may authenticate with a second client machine 608 by generating an array with values corresponding to a seed. In one example, this array storing a seed may be a predetermined row, column, or other pattern of cells in the masked grid stored at the first client machine. For example, the seed may comprise values A0, B0, C0, D0, and E0 from the masked grid—this second seed is different from the master/initial seed sent from the server machine. In some examples, to reduce additional computations, the second seed may be identical to the master seed at the compromise of added security.

Meanwhile, the second client machine may store in its memory the second cypher text, which includes a second masked grid with the second seed. As the masked grid at client machine 608 illustrates, the masked grid may comprise static values and/or values calculated with the second seed. Client machine 608 may store a masked grid with cell F0 equal to "E0+4"; H0 equal to "E0+7"; F4 equal to "B0+8"; and J4 equal to "E0+6". As such, without the actual values of the second seed (e.g., E0, B0, and others), the second client machine 608 is unable to authenticate and validate with the first client machine 604. As indicated in the preceding examples, the second masked grid with the second seed may be a 2-dimensional (2D) matrix with second data values and the second seed. The second seed may include at least variables A0, B0, and C0, which correspond to x-coordinate and y-coordinates in the masked grid formatted as a 2D matrix. The second authorization codes (e.g., references) includes these variables. The second client machine 608 may construct and transmit a solution for the second cypher text using the second seed and data values in the second masked grid. The second solution may be transmitted to the first client machine 604 to unlock the second masked grid.

In some examples, the steps performed may further includes a step to unmask the second seed, by the first client machine 604, using the constructed second solution from the second client machine 608 and a second data grid stored in memory at the client machine. The unlocking of the second masked grid may include steps, by the client machine, to identify portions of the constructed second solution that reference A0, and calculate a value of A0 using the identified portions and corresponding data values stored in the second data grid. Then, the client machine confirms that the calculated value of A0 matches a stored value of A0 in memory at the client machine. When the values match, the client device has been validated, and it is safe to transmit the second unmasked seed, which includes the stored value of A0, to the second client machine. The steps performed may further include transmitting, by the client machine, an unmasked second seed to the second client machine, and transmitting, by the client machine, second authorization codes (e.g., references) to the second client machine.

The steps of the method performed by the second client machine 608 may further include dynamically generating a second one-time code (OTC) 606 using the second unmasked seed, the second authorization codes, and/or the second masked grid. For example, the OTC 606 may be an array of a plurality of cells from the second masked grid—e.g., F1, G1, H2, T0, J4. The second client machine 608 may be able to identify the values of the OTC 606 only once it successfully authenticates with the master client machine 604 and determines the actual values of each cell in the 2D matrix corresponding to the second masked grid. In some examples, all three items—second unmasked seed, the second authorization codes, and the second masked grid—may be used to generate the OTC 606, but in other examples, all three items may not be necessary. Then the second client machine 608 may transmit the new OTC to the client machine 604. The method may include step to validate, by the client machine 604, the second OTC from the second client machine 608 using the second data grid stored in memory at the client machine. After the client machine 604 validates the second OTC, the client machine 604 may grant the second client machine 608 access to the server machine. This authorization may occur, in some examples, by the client machine 604 acting as a conduit to tunnel communication from the second client machine 604 to its endpoint at the server machine. The second client machine 608 may encrypt, in some examples, the confidential data content of its communication end-to-end with the server machine. In other examples, the circle of trust created between the server machine and the first client machine 604 may be extended to the second client machine 608, thus no added security is desired for communications between these components over the authenticated communication channels.

In some examples, the method may further include steps to hash, by the second client machine, the second OTC before sending to the client machine. Moreover, in some examples, the second client machine may receive the second authorization codes from the client machine, and then decryption is performed on the second authorization codes before constructing the second solution for the second cypher text. In other words, the constructing, by the second client machine, of the second solution for the second cypher text may use the second authorization codes.

While FIG. 6 illustrates three client machines 604, 608, 610, the disclosure is not so limited. A masked grid and seed may be used for any number of client machines communicatively coupled to the master client machine 604 and/or daisy-chained to other client machines 608 in the computing environment. In each instance, the OTC 606 may be generated using a plurality of values discoverable only after unmasking/unlocking a masked grid and seed at the client machine. The disclosure is not limited to the specific combinations illustrated in FIG. 6, but rather is amenable to any combination of seed variable and/or static value combinations. For example, a cell in the masked grid may be multiple seeds combined with one or more arithmetic operations and static integer values.

Figure 7:
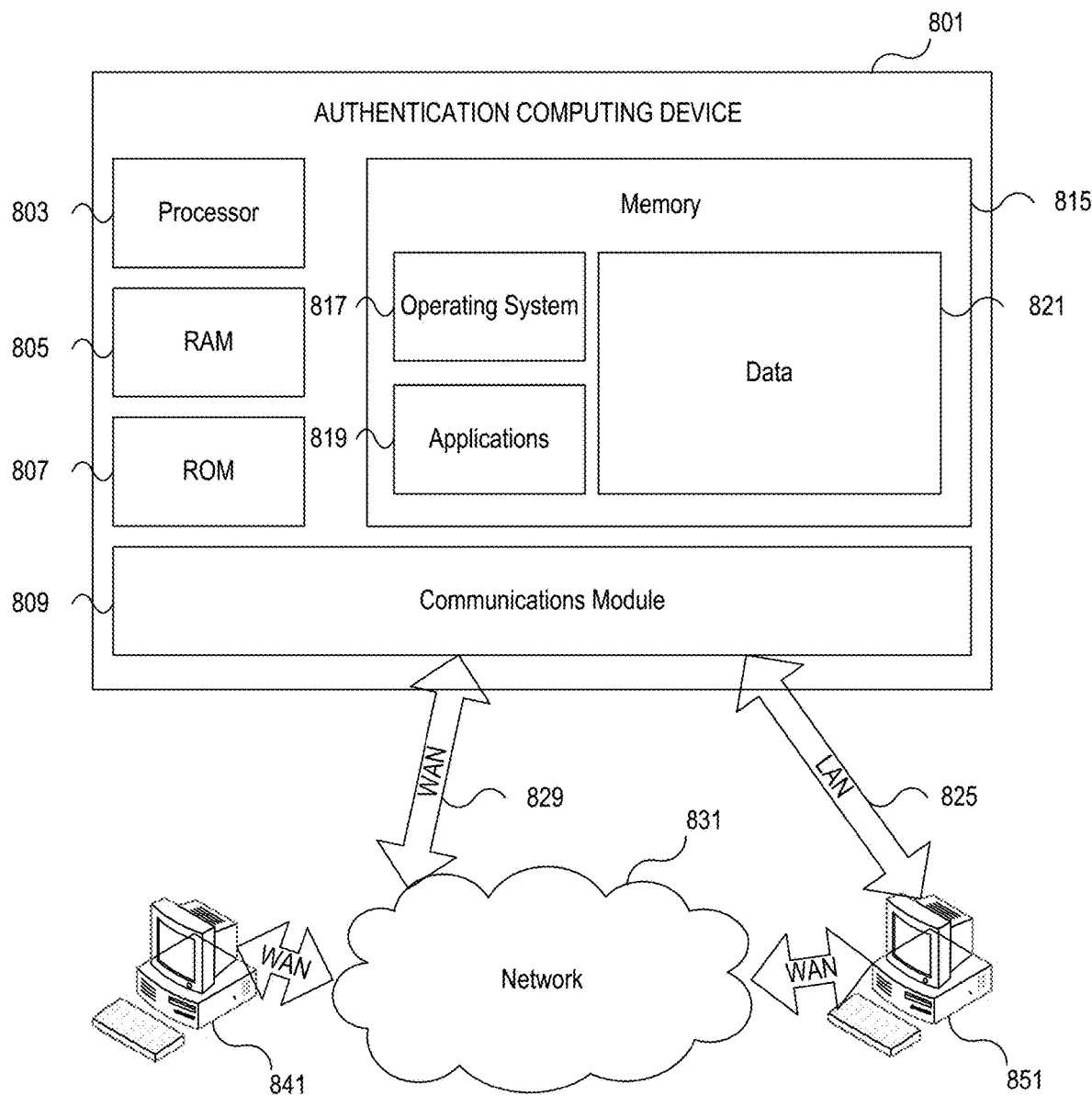
FIG. 7 illustrates one example operating environment in which various aspects of the disclosure may be implemented in accordance with one or more aspects described herein.

FIG. 7 depicts an illustrative operating environment in which various aspects of the present disclosure may be implemented in accordance with one or more example embodiments. Computing system environment 800 may be used according to one or more illustrative embodiments. Computing system environment 800 is only one example of a suitable computing environment and is not intended to suggest any limitation as to the scope of use or functionality contained in the disclosure. Computing system environment 800 should not be interpreted as having any dependency or requirement relating to any one or combination of components shown in illustrative computing system environment 800.

Computing system environment 800 may include authentication computing device 801 having processor 803 for controlling overall operation of authentication computing device 801 and its associated components, including random access memory (RAM) 805, read-only memory (ROM) 807, communications module 809, and memory 815. Authentication computing device 801 may include a variety of computer readable media. Computer readable media may be any available media that may be accessed by authentication computing device 801, may be non-transitory, and may include volatile and nonvolatile, removable and non-removable media implemented in any method or technology for storage of information such as computer-readable instructions, object code, data structures, program modules, or other data. Examples of computer readable media may include RAM, ROM, Electronically Erasable Programmable Read-Only Memory (EEPROM), flash memory or other memory technology, Compact Disk Read-Only Memory (CD-ROM), Digital Versatile Disk (DVD) or other optical disk storage, magnetic cassettes, magnetic tape, magnetic disk storage or other magnetic storage devices, or any other medium that can be used to store the desired information and that can be accessed by authentication computing device 801.

Although not required, various aspects described herein may be embodied as a method, a data transfer system, or as a computer-readable medium storing computer-executable instructions. For example, a computer-readable medium storing instructions to cause a processor to perform steps of a method in accordance with aspects of the disclosed embodiments is contemplated. For example, aspects of method steps disclosed herein may be executed on a processor on authentication computing device 801. Such a processor may execute computer-executable instructions stored on a computer-readable medium.

Software may be stored within memory 815 and/or storage to provide instructions to processor 803 for enabling authentication computing device 801 to perform various functions as discussed herein. For example, memory 815 may store software used by authentication computing device 801, such as operating system 817, application programs 819, and associated database 821. Also, some or all of the computer executable instructions for authentication computing device 801 may be embodied in hardware or firmware. Although not shown, RAM 805 may include one or more applications representing the application data stored in RAM 805 while authentication computing device 801 is on and corresponding software applications (e.g., software tasks) are running on authentication computing device 801.

Communications module 809 may include a microphone, keypad, touch screen, and/or stylus through which a user of authentication computing device 801 may provide input, and may also include one or more of a speaker for providing audio output and a video display device for providing textual, audiovisual and/or graphical output. Computing system environment 800 may also include optical scanners (not shown).

Authentication computing device 801 may operate in a networked environment supporting connections to one or more remote computing devices, such as computing devices 841 and 851. Computing devices 841 and 851 may be personal computing devices or servers that include any or all of the elements described above relative to authentication computing device 801.

The network connections depicted in FIG. 7 may include Local Area Network (LAN) 825 and Wide Area Network (WAN) 829, as well as other networks. When used in a LAN networking environment, authentication computing device 801 may be connected to LAN 825 through a network interface or adapter in communications module 809. When used in a WAN networking environment, authentication computing device 801 may include a modem in communications module 809 or other means for establishing communications over WAN 829, such as network 831 (e.g., public network, private network, Internet, intranet, and the like). The network connections shown are illustrative and other means of establishing a communications link between the computing devices may be used. Various well-known protocols such as Transmission Control Protocol/Internet Protocol (TCP/IP), Ethernet, File Transfer Protocol (FTP), Hypertext Transfer Protocol (HTTP) and the like may be used, and the system can be operated in a client-server configuration to permit a user to retrieve web pages from a web-based server.

The disclosure is operational with numerous other computing system environments or configurations. Examples of computing systems, environments, and/or configurations that may be suitable for use with the disclosed embodiments include, but are not limited to, personal computers (PCs), server computers, hand-held or laptop devices, smart phones, multiprocessor systems, microprocessor-based systems, set top boxes, programmable consumer electronics, network PCs, minicomputers, mainframe computers, distributed computing environments that include any of the above systems or devices, and the like that are configured to perform the functions described herein.

One or more aspects of the disclosure may be embodied in computer-usable data or computer-executable instructions, such as in one or more program modules, executed by one or more computers or other devices to perform the operations described herein. Generally, program modules include routines, programs, objects, components, data structures, and the like that perform particular tasks or implement particular abstract data types when executed by one or more processors in a computer or other data processing device. The computer-executable instructions may be stored as computer-readable instructions on a computer-readable medium such as a hard disk, optical disk, removable storage media, solid-state memory, RAM, and the like. The functionality of the program modules may be combined or distributed as desired in various embodiments. In addition, the functionality may be embodied in whole or in part in firmware or hardware equivalents, such as integrated circuits, application-specific integrated circuits (ASICs), field programmable gate arrays (FPGA), and the like. Particular data structures may be used to more effectively implement one or more aspects of the disclosure, and such data structures are contemplated to be within the scope of computer executable instructions and computer-usable data described herein.

Various aspects described herein may be embodied as a method, an apparatus, or as one or more computer-readable media storing computer-executable instructions. Accordingly, those aspects may take the form of an entirely hardware embodiment, an entirely software embodiment, an entirely firmware embodiment, or an embodiment combining software, hardware, and firmware aspects in any combination. In addition, various signals representing data or events as described herein may be transferred between a source and a destination in the form of light or electromagnetic waves traveling through signal-conducting media such as metal wires, optical fibers, or wireless transmission media (e.g., air or space). In general, the one or more computer-readable media may be and/or include one or more non-transitory computer-readable media.

As described herein, the various methods and acts may be operative across one or more computing servers and one or more networks. The functionality may be distributed in any manner, or may be located in a single computing device (e.g., a server, a client computer, and the like). For example, in alternative embodiments, one or more of the computing platforms discussed above may be combined into a single computing platform, and the various functions of each computing platform may be performed by the single computing platform. In such arrangements, any and/or all of the above-discussed communications between computing platforms may correspond to data being accessed, moved, modified, updated, and/or otherwise used by the single computing platform. Additionally or alternatively, one or more of the computing platforms discussed above may be implemented in one or more virtual machines that are provided by one or more physical computing devices. In such arrangements, the various functions of each computing platform may be performed by the one or more virtual machines, and any and/or all of the above-discussed communications between computing platforms may correspond to data being accessed, moved, modified, updated, and/or otherwise used by the one or more virtual machines.

Aspects of the disclosure have been described in terms of illustrative embodiments thereof. Numerous other embodiments, modifications, and variations within the scope and spirit of the appended claims will occur to persons of ordinary skill in the art from a review of this disclosure. For example, one or more of the steps depicted in the illustrative figures may be performed in other than the recited order, and one or more depicted steps may be optional in accordance with aspects of the disclosure. The use of one-time password (OTP) and one-time code (OTC) is interchangeable in the disclosure. OTP is not limited to traditional text passwords used by humans; rather, OTP is the same as OTC in that the password may be any code usable by a human and/or machine.

We claim:

1. A system for authenticating a plurality of client machines with a server machine using one-time codes (OTC), the system comprising:
    a server machine comprising a processor and a memory storing an authentication module;
    a first client machine comprising a processor, a memory, and a network communication interface, wherein the first client machine is communicatively coupled to the server machine via the network communication interface, wherein the memory of the first client machine further stores an interface to the authentication module;
    a second client machine coupled to the first client machine and which is not in direct communication with the server machine;
    a third client machine coupled to the second client machine;
    wherein the second machine is configured to authenticate and validate a secure connection with the server machine through the first client machine by using a cypher text that the authentication module of the server machine used to validate the first client machine, and wherein the second client machine stores computer-executable instructions that, when executed by a processor, cause the system to:
    store, by the second client machine, a second cypher text in memory at the second client machine, wherein the second cypher text comprises a second masked grid with a second seed;
    construct, by the second client machine, a second solution for the second cypher text using the second seed and data values in the second masked grid;
    transmit, by the second client machine, the constructed second solution to the first client machine to unlock the second masked grid;
    unmask the second seed, by the first client machine, using the constructed second solution from the second client machine and a second data grid stored in memory at the first client machine;
    transmit, by the first client machine, an unmasked second seed to the second client machine;
    transmit, by the first client machine, second authorization codes to the second client machine;
    dynamically generate, by the second client machine, a second OTC using the second unmasked seed, the second authorization codes, and the second masked grid;
    send, by the second client machine, the second OTC to the first client machine, wherein the second OTC corresponds to the second authorization codes;

validate, by the first client machine, the second OTC from the second client machine using the second data grid stored in memory at the first client machine;

and after validation of the second OTC by the first client machine, grant, by the first client machine, the second client machine access to the server machine.

2. The system of claim 1, wherein the authentication module is configured to perform a method comprising steps to:

store, through the interface at the first client machine, the cypher text in memory at the first client machine, wherein the cypher text comprises a masked grid with a seed;

construct, by the interface at the first client machine, a solution for the cypher text using the seed and data values in the masked grid;

transmit, by the interface at the first client machine, the constructed solution to the server machine to unlock the masked grid;

unmask the seed, by the server machine, using the constructed solution from the first client machine and a data grid stored in memory at the server machine;

transmit, by the server machine, an unmasked seed to the first client machine;

transmit, by the server machine, authorization codes to the first client machine;

dynamically generate, by the interface at the first client machine, a one-time code (OTC) using the unmasked seed, the authorization codes, and the masked grid;

send, by the interface at the first client machine, the OTC to the server machine, wherein the OTC corresponds to the authorization codes;

validate, by the server machine, the OTC from the first client machine using the data grid stored in memory at the server machine; and after validation of the OTC by the server machine, grant, by the server machine, the first client machine access to a database at the server machine.

3. The system of claim 1, wherein the authentication module of the server machine, when executed by the processor of the server machine, causes the server machine to:

retrieve a seed;

transmit the seed to the first client machine;

receive an OTC from the first client machine, wherein the OTC was dynamically generated at the first client machine;

validate the OTC; and upon validation of the OTC, send an indication of grant to the first client machine to access a database at the server machine.

4. A method for authenticating a client machine with a server machine using a one-time code (OTC), the method comprising steps to:

store, by the client machine, a cypher text in memory at the client machine, wherein the cypher text comprises a masked grid with a seed;

construct, by the client machine, a solution for the cypher text using the seed and data values in the masked grid;

transmit, by the client machine, the constructed solution to the server machine to unlock the masked grid;

unmask the seed, by the server machine, using the constructed solution from the client machine and a data grid stored in memory at the server machine;

transmit, by the server machine, an unmasked seed to the client machine;

transmit, by the server machine, authorization codes to the client machine;

dynamically generate, by the client machine, a one-time code (OTC) using the unmasked seed, the authorization codes, and the masked grid;

send, by the client machine, the OTC to the server machine, wherein the OTC corresponds to the authorization codes;

validate, by the server machine, the OTC from the client machine using the data grid stored in memory at the server machine; and after validation of the OTC by the server machine, grant, by the server machine, the client machine access to a database at the server machine.

5. The method of claim 4, wherein the masked grid with the seed is a 2D matrix with data values and the seed.

6. The method of claim 5, wherein the seed comprises at least S0, S1, and S2, and wherein the authorization codes comprise x-coordinates and y-coordinates corresponding to the 2D matrix.

7. The method of claim 6, wherein the unlocking the masked grid comprises steps, by the server machine, to:

identify portions of the constructed solution that reference S0;

calculate a value of S0 using the identified portions and corresponding data values stored in the data grid;

confirm that the calculated value of S0 matches a stored value of S0 in memory at the server machine; and transmit the unmasked seed to the client machine, wherein the unmasked seed comprises the stored value of S0.

8. The method of claim 4, wherein the data grid stored in the memory at the server machine comprises a 2D matrix with data values corresponding to x-coordinates and y-coordinates on the 2D matrix, and wherein the authorization codes are x-y coordinate pairings corresponding to the 2D matrix.

9. The method of claim 4, further comprising steps to hash, by the client machine, the OTC before sending to the server machine.

10. The method of claim 4, further comprising steps to:

hash, by the client machine, the OTC before sending to the server machine; and decrypt, by the client machine, the authorization codes received from the server machine;

wherein the authorization codes from the server machine are received, by the client machine, before constructing the solution for the cypher text; and wherein the constructing, by the client machine, the solution for the cypher text uses the authorization codes.

11. The method of claim 4, wherein the validating the OTC comprises steps, by the server machine, to:

un-hash the OTC received from the client machine;

confirm that the unhashed OTC matches the authorization codes stored in the memory at the server machine; and establish a secure connection for the client machine to access the database at the server machine.

12. The method of claim 4, further comprising steps to recycle the cypher text to authenticate a second client machine, which is not in direct communication with the server machine, to:

store, by the second client machine, a second cypher text in memory at the second client machine, wherein the cypher text comprises a second masked grid with a second seed;

construct, by the second client machine, a second solution for the second cypher text using the second seed and data values in the second masked grid;

transmit, by the second client machine, the constructed second solution to the client machine to unlock the second masked grid;
unmask the second seed, by the client machine, using the constructed second solution from the second client machine and a second data grid stored in memory at the client machine;
transmit, by the client machine, an unmasked second seed to the second client machine;
transmit, by the client machine, second authorization codes to the second client machine;
dynamically generate, by the second client machine, a second one-time code using the second unmasked seed, the second authorization codes, and the second masked grid;
send, by the second client machine, the second OTC to the client machine, wherein the second OTC corresponds to the second authorization codes;
validate, by the client machine, the second OTC from the second client machine using the second data grid stored in memory at the client machine; and
after validation of the second OTC by the client machine, grant, by the client machine, the second client machine access to the server machine.

13. The method of claim 12, wherein the second masked grid with the second seed is a 2D matrix with second data values and the second seed, wherein the second seed comprises at least A0, B0, and C0, and wherein the second authorization codes comprise x-coordinates and y-coordinates corresponding to the second masked grid formatted as the 2D matrix.

14. The method of claim 12, wherein the unlocking the second masked grid comprises steps, by the client machine, to:
identify portions of the constructed second solution that reference A0;
calculate a value of A0 using the identified portions and corresponding data values stored in the second data grid;
confirm that the calculated value of A0 matches a stored value of A0 in memory at the client machine; and
transmit the second unmasked seed to the second client machine, wherein the second unmasked seed comprises the stored value of A0.

15. The method of claim 12, further comprising steps to:
hash, by the second client machine, the second OTC before sending to the client machine; and
decrypt, by the second client machine, the second authorization codes received from the client machine;
wherein the second authorization codes from the client machine are received, by the second client machine, before constructing the second solution for the second cypher text; and
wherein the constructing, by the second client machine, the second solution for the second cypher text uses the second authorization codes.

16. The method of claim 12, wherein the second client machine is a smartwatch.

17. The method of claim 12, wherein the second client machine comprises an augmented reality (AR) headgear.

18. One or more non-transitory computer-readable media storing instructions that, when executed by one or more computer processors, causes one or more client machines to:
store, by a client machine, a cypher text in memory at the client machine, wherein the cypher text comprises a masked grid with a seed;
construct, by the client machine, a solution for the cypher text using the seed and data values in the masked grid;
transmit, by the client machine, the constructed solution to a server machine to unlock the masked grid;
receive, by the client machine from the server machine, an unmasked seed and authorization codes, wherein the server machine unmasked the seed using the constructed solution from the client machine and a data grid stored in memory at the server machine;
dynamically generate, by the client machine, a one-time code (OTC) using the unmasked seed, the authorization codes, and the masked grid;
send, by the client machine, the OTC to the server machine, wherein the OTC corresponds to the authorization codes; and
receive a grant, from the server machine, after validation of the OTC by the server machine, to access, by the client machine, a database at the server machine, wherein the server machine used the data grid stored in memory at the server machine to validate the OTC from the client machine.

19. The one or more non-transitory computer-readable media of claim 18 further storing instructions that, when executed by the one or more computer processors, causes one or more client machines to:
store, by a second client machine, a second cypher text in memory at the second client machine, wherein the cypher text comprises a second masked grid with a second seed;
construct, by the second client machine, a second solution for the second cypher text using the second seed and data values in the second masked grid;
transmit, by the second client machine, the constructed second solution to the client machine to unlock the second masked grid;
unmask the second seed, by the client machine, using the constructed second solution from the second client machine and a second data grid stored in memory at the client machine;
transmit, by the client machine, an unmasked second seed to the second client machine;
transmit, by the client machine, second authorization codes to the second client machine;
dynamically generate, by the second client machine, a second one-time code using the second unmasked seed, the second authorization codes, and the second masked grid;
send, by the second client machine, the second OTC to the client machine, wherein the second OTC corresponds to the second authorization codes;
validate, by the client machine, the second OTC from the second client machine using the second data grid stored in memory at the client machine; and
after validation of the second OTC by the client machine, grant, by the client machine, the second client machine access to the server machine.

20. The one or more non-transitory computer-readable media of claim 18, wherein the second client machine comprises at least one of a smartwatch and an augmented reality (AR) headgear.

* * * * *